May 31, 1966 R. D. MELDAHL 3,253,391

LAWN MOWER CONTROL MECHANISM

Filed Dec. 30, 1963 5 Sheets-Sheet 1

INVENTOR.
Robert D. Meldahl
BY Robert D. Meldahl

May 31, 1966 R. D. MELDAHL 3,253,391
LAWN MOWER CONTROL MECHANISM
Filed Dec. 30, 1963 5 Sheets-Sheet 3

INVENTOR.
ROBERT D. MELDAHL
BY
*Warren D. Hackbert*
Attorney

May 31, 1966  R. D. MELDAHL  3,253,391
LAWN MOWER CONTROL MECHANISM
Filed Dec. 30, 1963  5 Sheets-Sheet 5
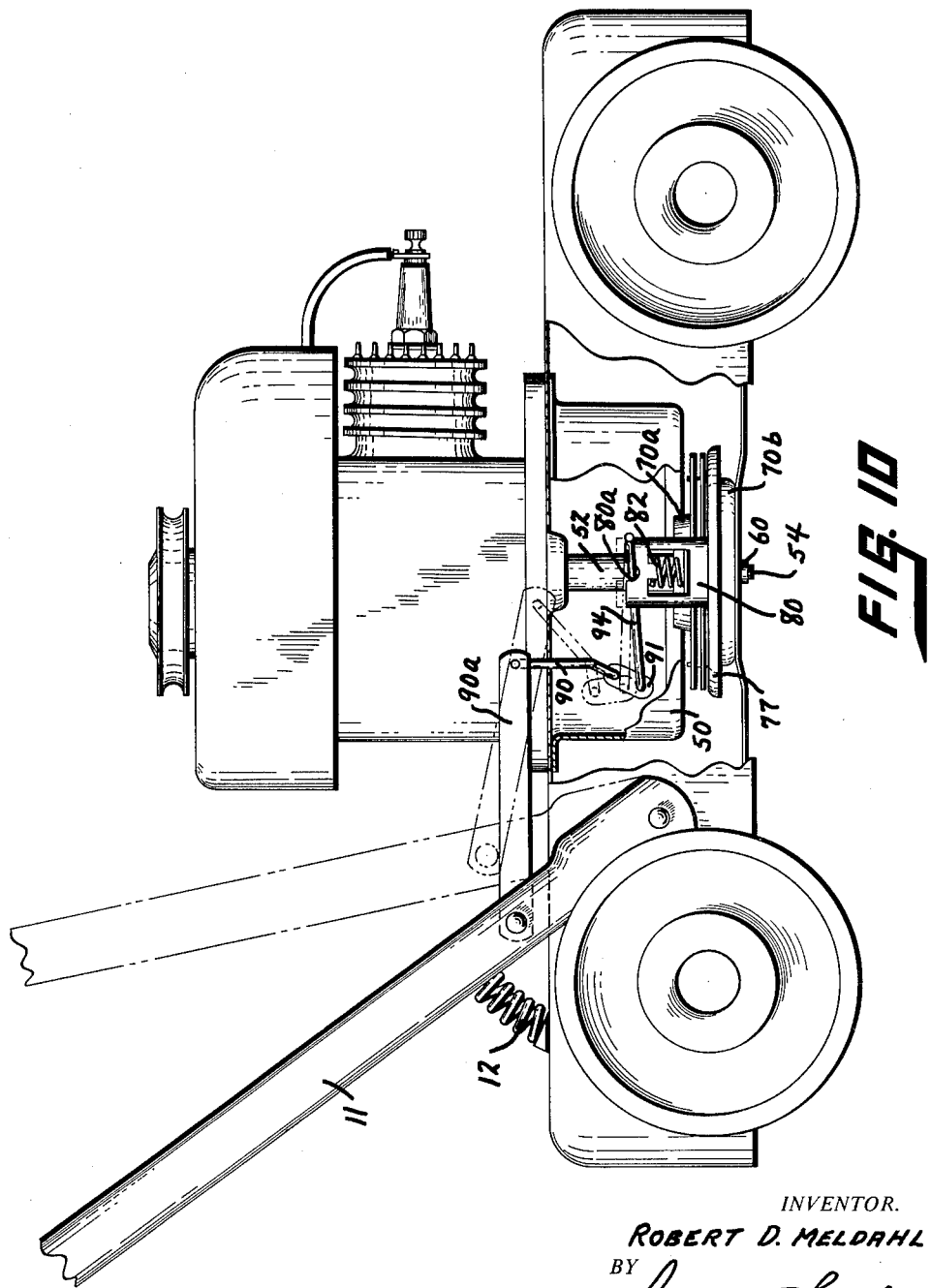
INVENTOR.
ROBERT D. MELDAHL
BY
Attorney

United States Patent Office 3,253,391
Patented May 31, 1966

3,253,391
LAWN MOWER CONTROL MECHANISM
Robert D. Meldahl, Marion, Ohio
(332 W. Elm St., Granville, Ohio)
Filed Dec. 30, 1963, Ser. No. 337,701
6 Claims. (Cl. 56—25.4)

The present invention relates to a lawn mower, and more particularly to a handle controlled combination blade brake and clutch for a rotary type power lawn mower, the instant application being a continuation-in-part of patent application Serial No. 97,200, filed March 21, 1961, for Lawn Mower, now abandoned.

As is known, the hazards relating to the use of rotary power lawn mowers are widespread. In most cases involving injury caused by a rotating mower blade, the operator is located other than in his normal operating position or, alternatively, is in the normal operating position, but is standing so close to the mower that the mower handle is raised. Accordingly, there has been considerable development in connection with safety features for rotary power lawn mowers, many of which, however, have proven inferior, have been uneconomical insofar as manufacturing is concerned, or have not met with public acceptance.

By virtue of the instant invention, the applicant has provided a new and novel combination blade brake and clutch for a rotary power lawn mower which renders the blade stationary and harmless whenever the mower handle is in a released or raised position. Thus, for example, whenever the user is starting or stopping the mower engine, removing debris from the front of the mower, or, when operating, the user stands too close to the mower or the mower rolls backwardly, resulting in the upward movement of the mower handle, the mower blade stops rotating, preventing any injury.

The preceding effective results are achieved through the use of a centrifugal force actuated clutch utilizing engaging elements responsive to the speed of rotation of the driven member, i.e. the mower blade, with the consequence that when the mower blade is restrained from rotating, through braking action when the handle is raised, no centrifugal force acts on the engaging elements and, accordingly, no effective engaging action is accomplished regardless of the speed of rotation of the mower motor.

As noted hereabove, the raising of the handle used to steer or propel the rotary power mower effects automatic brake relase action, and, conversely, when the mower handle is lowered. Subsequent to the release of the brake, the centrifugal force controlled clutch action commences, where the instant invention is adaptable for use with band, disc, and shoe type braking arrangements.

Accordingly, the principal object of the present invention is to provide a new and novel combination brake and clutch for a rotary type power lawn mower.

Another object of the present invention is to provide a new and novel automatically controlled brake and clutch arrangement for a rotary type power lawn mower.

A further and more specific object of the present invention is to provide a rotary type power lawn mower having a new and novel blade brake which is responsive to the position of the handle used for propelling and/or steering the power lawn mower.

A still further and another specific object of the present invention is to provide an automatic idler for the engine of a rotary type power lawn mower which is responsive to the setting of the mower brake.

Still another and more general object of the present invention is to provide an important safety feature for rotary power lawn mowers which is automatic in operation in response to the position of the lawn mower handle, which is mechanically advantageous, which is representative of manufacturing economies, and which is highly effective in use.

Other objects and a better understanding of the present invention will become more apparent from the following description, taken in conjunction with the accompanying drawings, in which FIG. 1 is a view in side elevation showing one embodiment of the applicant's new and novel combination brake and clutch;

Figure 1:
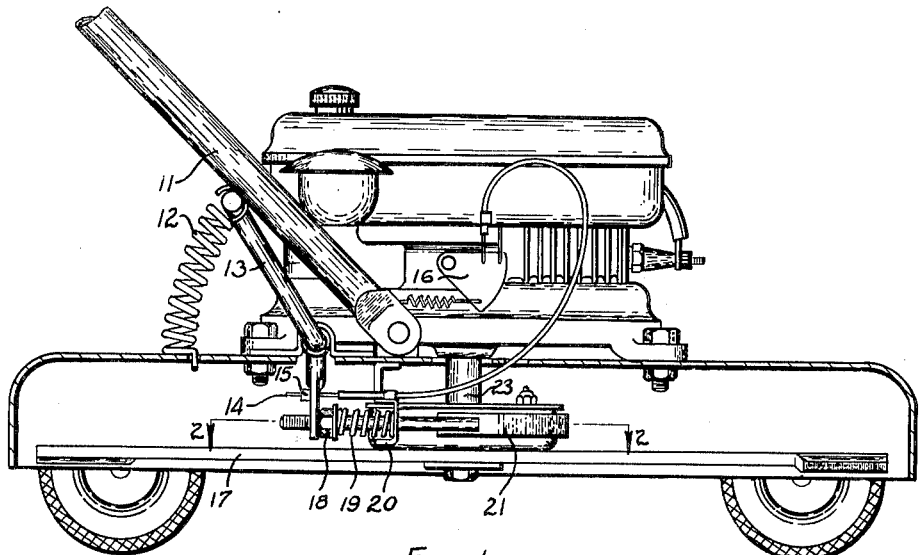

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
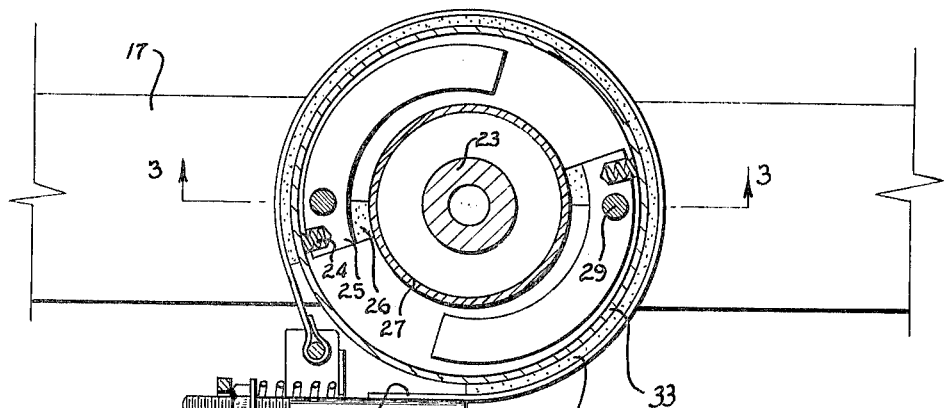
FIG. 2 is a view in horizontal section, taken at line 2—2 of FIG. 1 and looking in the direction of the arrows, showing details of the instant combination brake and clutch.
Figure 3:
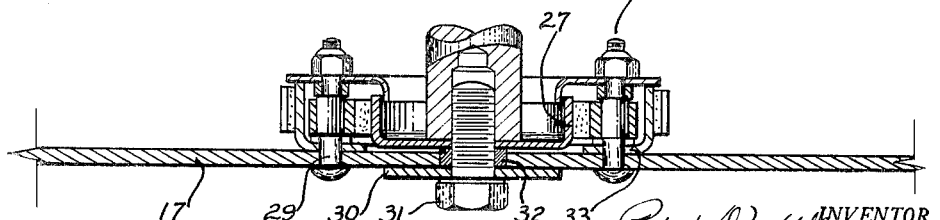
FIG. 3 is a view in vertical section, taken at line 3—3 of FIG. 2 and looking in the direction of the arrows, showing still further details of the instant combination brake and clutch.

Referring now to FIGS. 1, 2 and 3, a rotary type power lawn mower is disclosed having a mower blade 17 which is freely rotatable about the axis of the engine shaft 23 through a suspension system comprising a thrust washer 30, a screw 31, and a sleeve 32. As should be evident from FIG. 3, the mower blade 17 rests on the aforesaid thrust washer 30 and is freely rotatable about the sleeve 32, and, hence, the aforesaid engine shaft axis.

A brake drum 33 is fastened to the mower blade 17 through the use of pins 29, where clutch shoes 25 pivot on the latter. Linings 26 are secured to each of the clutch shoes 25, and the assemblies are completed through the use of clutch springs 24 which exert a light pressure on the clutch shoes 25, thereby developing a light friction between the linings 26 and a clutch drum 27. In this latter connection, the clutch drum 27 rotates with the engine shaft 23, being clamped thereto by a threaded screw 31 which acts through the thrust washer 30 and the sleeve 32.

The instant braking arrangement comprises a band 21 having a lining 28 secured thereto, where one end of the band 21 is fixedly secured to a portion of bracket 20 disposed on the power lawn mower housing, and another end is welded to an adjusting stud 22. The brake band 21 engages the brake drum 33 through the action of a brake setting spring 19, where the latter is seated by the bracket 20 (see FIGS. 1 and 2).

Extending downwardly from a handle 11 for the lawn mower is a brake release lever 13 which pivots in response to the downward movement of such mower handle 11, and against the force exerted by a return spring 12 which is disposed between the mower housing and the mower handle 11. The over-all brake assembly is completed through the use of a brake adjusting nut 18, which serves to control the braking pressure against the brake drum 33.

In use, the brake release lever 13 pivots in response to the downward motion of the mower handle 11 and, acting through the brake adjusting nut 18, overcomes the brake setting spring 19, thereby releasing the brake band 21. Conversely, when the mower handle 11 is released, the return spring 12 raises the mower handle and pivots the brake release lever 13 out of engagement with the brake adjusting nut 18, thereby allowing the brake setting spring 19 to set the brake band 21.

With further reference to FIG. 1, the applicant herein has provided an auxiliary throttle control cable 14 which, typically, extends through a portion of the brake release lever 13, where a clamp 15, which is fastened to the auxiliary throttle control cable 14, assures positive action of the latter upon movement of the brake release lever 13. The other end of the control cable 14 fastens to a rotatable throttle lever 16.

When the brake setting spring 19 sets the brake band 21, i.e. when the mower handle 11 is in a raised position, the brake release lever 13 actuates the auxiliary throttle control cable 14, which, consequently, moves the throttle lever 16 back to a position which idles the mower engine, thereby minimizing the required braking effort.

When the brake band 21 is set, nothing other than the light friction caused by the reaction of the clutch springs 24 onto the clutch shoes 25 restricts the motion of the clutch drum 27; however, this friction in itself does initiate the rotation of the mower blade 17 when the brake band 21 is released, for, as the mower blade 17 begins to rotate after such brake release, the centrifugal force acting on the clutch shoes 25 augments the light friction, and pressure, caused by the clutch springs 24, urging the clutch shoes 25 to pivot in a counterclockwise direction about the pins 29. The latter effect increases the friction between the linings 26 and the clutch drum 27, and causes the mower blade 17 to accelerate in its rotating action. The aforesaid acceleration, in turn, increases the centrifugal force, and consequently the friction, until the clutch drum 27 is fully engaged, at which time the mower blade 17 and the mower engine shaft 23 rotate together.

When braking effort is applied, i.e. when brake band 21 is set against the brake drum 33 while the mower blade 17 and the engine shaft 23 are rotating together, the mower blade 17 and the engine shaft 23 de-accelerate until the centrifugal force is insufficient to transmit the power of the mower engine. At this time, clutching action is released, and the mower blade 17 is rapidly stopped by the brake, where the centrifugal force is eliminated and the engine shaft 23 is free to rotate independently at its governed speed.

Figure 4:
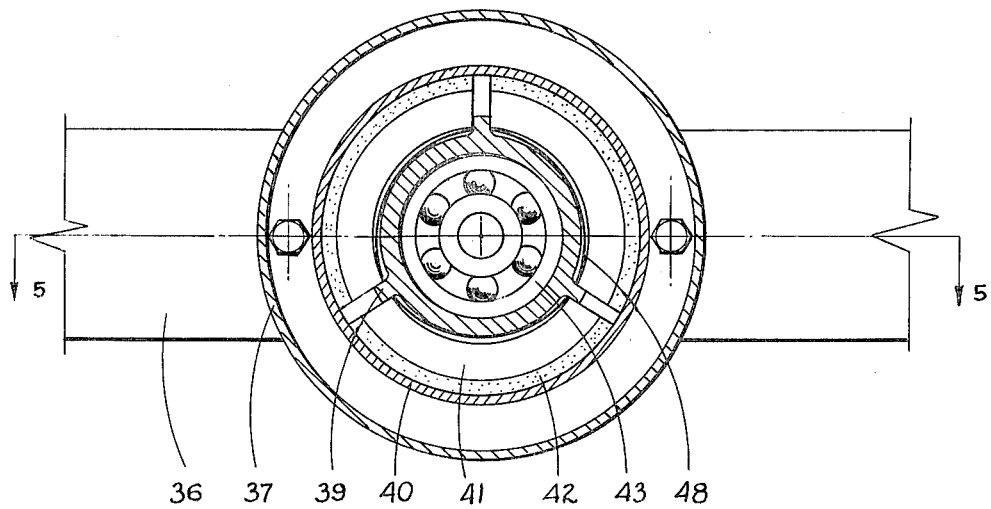
FIG. 4 is a view in horizontal section, partly fragmentary, of another embodiment of the applicant's invention.
Figure 5:
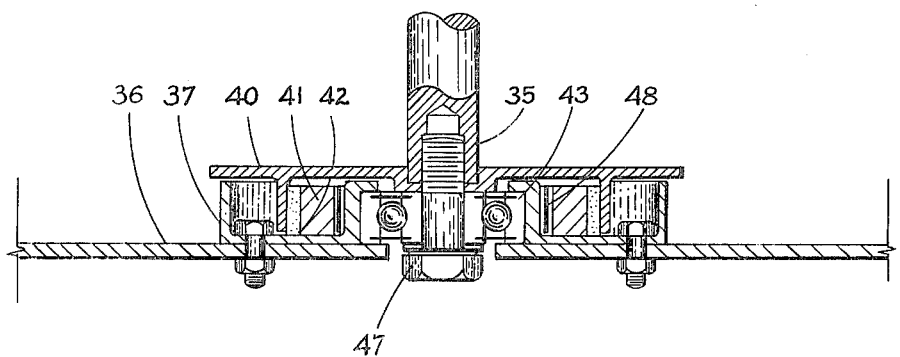
FIG. 5 is a view in vertical section, taken at line 5—5 of FIG. 4 and looking in the direction of the arrows, showing further details of the alternate embodiment.

With reference now to the embodiment of FIGS. 4 and 5, the mower blade 36 therein is secured, as by bolting, for example, to a brake drum 37, where the hub of the latter centers on a bearing 43. The bearing 43 has an inner race which, together with a clutch cup 40, are secured to the engine drive shaft 35 by a cap screw 47 so that the clutch cup 40 rotates with the engine shaft 35. Radiating from, and integral with, the hub of the brake drum 37 are driving lugs 39, where clutch shoes 41, having linings 42, are disposed between such driving lugs 39.

The over-all assembly is completed by leaf springs 48 which are positioned to cause the clutch shoes 41 to bear lightly against the clutch cup 40, thereby developing a light frictional force between the clutch cup 40 and the clutch shoes 41. While such light frictional force offers negligible resistance to the rotation of the clutch cup 40 when the mower blade 36 is restrained from rotating, it is sufficient to cause the mower blade 36 to begin rotating when not so restrained. Accordingly, as the mower blade 36 starts to rotate, centrifugal force acting on the clutch shoes 41 augments the aforesaid pressure from the leaf springs 48, increasing the friction and causing the mower blade 36 to accelerate until the centrifugal force is sufficient to fully engage the clutch shoes 41 with the clutch cup 40.

As with the prior embodiment of the invention, and although not specifically disclosed in the drawing, a band brake is employed which is in selective engagement with the brake drum 37, and the setting of such brake causes deacceleration leading to loss of clutching action and the ultimate independent rotation of the mower engine shaft 35 from the clutch cup 40, at which time the mower blade 36 becomes stationary.

Referring now to the embodiment of FIGS. 6, 7, 8, 9 and 10, a well 50 is centrally disposed within the mower housing beneath the power source 51 and around the power shaft 52 of the latter. The bottom surface of the well 50 has a centrally disposed opening defined by an upturned flange 50a. The engine shaft 52 receives, at its free end, a bolt 54 having a collar 54a thereon, where the latter serves to position a power transfer member 56. The power transfer member 56 is keyed, at 57, to the power shaft 52, so that both rotate together.

Disposed around a bearing member 60 on the bottom end of the bolt 54 is a cutting blade 65, where the latter is supported by pin assemblies 66 which extend through a driven assembly 70, where the latter, in use, i.e. after braking is released, to be discussed hereinbelow, normally rests on a face defined on the power transfer member 56. Pivotally disposed on the pin assemblies 66, and, typically, on spacers 69, are clutch shoes 72 where, in a typical form of the invention, linings 73 and 71 are respectively disposed on the driven assembly 70 and the clutch shoes 72.

The driven assembly 70 comprises an upper member 70a to which the aforesaid lining 73 is disposed, the latter being on an upwardly and inwardly extending portion thereof, where such upper member 70a has a friction disc 75 extending around its outer edge. The driven assembly 70 also has a lower member 70b which extends upwardly into assembled relationship with the upper member 70a. An inverted plate-like member 77, a brake pressure plate, extends outwardly and downwardly into fixed assembled relationship with oppositely disposed upstanding members 80.

Figure 6:
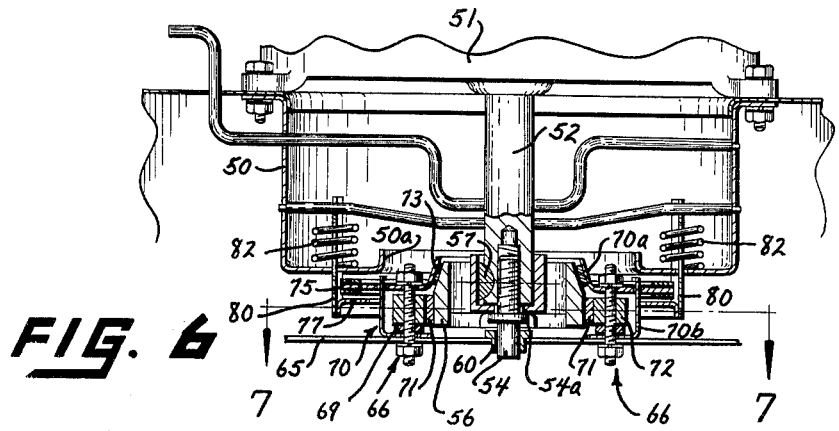
FIG. 6 is a view in vertical section of a further embodiment in accordance with the teachings of the instant invention.
Figure 7:
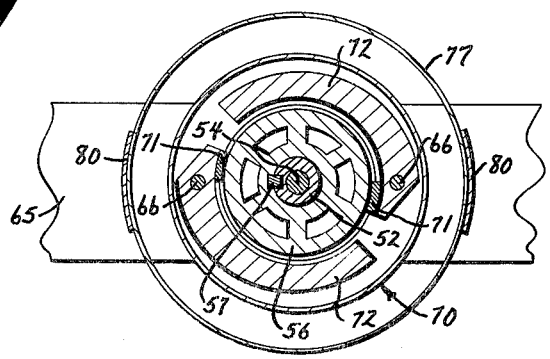
FIG. 7 is a view in horizontal section, taken at line 7—7 on FIG. 6 and looking in the direction of the arrows, showing added structural details of the further embodiments.
Figure 8:
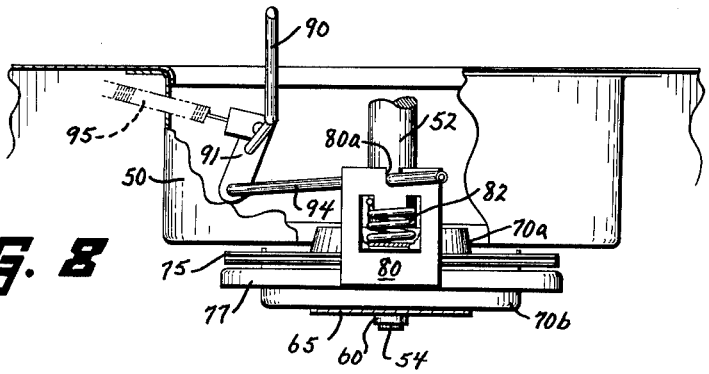
FIG. 8 is a view in side elevation, partly broken away, showing a typical linkage system for operating the embodiment of the invention of FIGS. 6 and 7.
Figure 9:
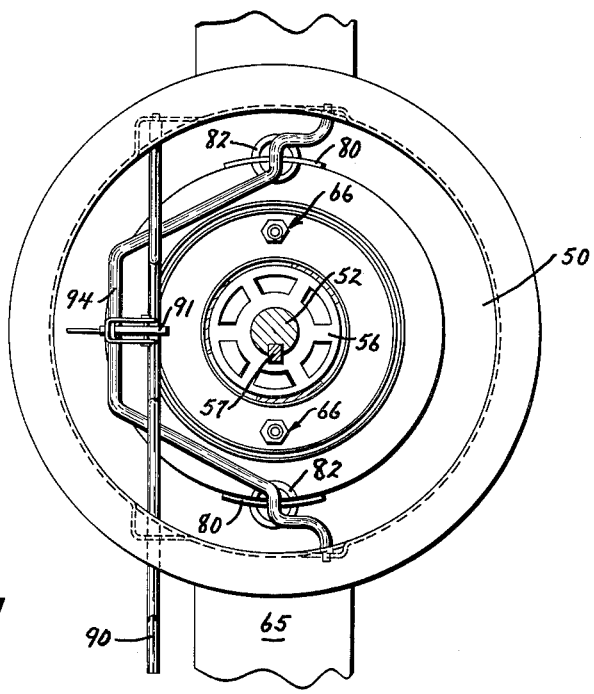
FIG. 9 is a plan view, partly broken away, showing other details of the linkage system of FIG. 8; and, FIG. 10 is another view in side elevation showing still further details of the invention at hand.

Each of the upstanding members 80 extends through the bottom surface of the well 50 and, as should be particularly apparent from FIGS. 6 and 8, is arranged to receive a tension device, such as a spring 82, which, provide positive unit action. In this latter connection, and as will become apparent from the following discussion, the driven assembly 70 is movable from an engaging or braking position with a portion of the well 50 on the housing of the mower to the aforesaid operative position resting on the power transfer member 56, and it is at this latter position that effective cutting action is accomplished.

In order to control the positioning of the aforesaid driven assembly 70, a linkage system is typically employed which includes an irregularly shaped linkage member 90 disposed across and mounted on the well 50, where a pivotal member 91 is positioned at the mid-portion thereof. The pivotal member 91 receives another linkage member 94 which also extends across and is mounted on the well 50, in this instance, however, the latter seats, as well, in cut-out portions 80a in each of the upstanding members 80. As apparent from FIG. 10 of the drawings, the linkage 90 is operatively connected to the mower handle through a linkage 90a, so that upon the raising of the handle, considering the continual and automatic urging of the spring 12, braking is effected, as in the instance of the prior embodiments of the invention.

In the alternative, and as disclosed by phantom lines in FIG. 8, a wire control 95 may be used for effecting the desired braking action, instead of the mower handle and linkage system arrangement described hereabove. In the alternative structure, such wire control 95 connects directly to the pivotal member 91.

In any event, when the linkage control system is employed, and when linkage 90 rotates, causing the pivotal member 91 to rotate, and, hence, the linkage 94, the driven assembly 70 moves upwardly so that the friction disc 75 on the upper member 70a thereof comes into engagement with the lower surface of the well 50. When the preceding occurs, the driven assembly 70 is disunited from its engaging relationship with the face of the power transfer member 56, to be discussed more fully herebelow.

When the mower handle is lowered, the driven assembly 70, through its weight, is caused to rest on the power transfer member 56, and as the latter rotates with the engine shaft 52, the driven member starts to slowly rotate, together with the cutting blade 65. As rotation continues, a centrifugal effect accumulates whereby the clutch shoes 72, through linings 71, engage the power transfer member 56, and, ultimately, the driven assembly 70 and the cutting blade 65 rotate together with the power shaft 52.

In order to stop the unit, braking is effected through the linkage control system, elevating the brake pressure plate 77 and thereby holding the friction disc 75 firmly against the lower surface of the well 50. As a result, a loss of contact occurs between the lining 73 and the power transfer member 56, causing deacceleration to the ultimate point that the power shaft 52 is rotating independently of the driven assembly 70. The same result occurs when the cutting blade 65 hits an immovable object, i.e. the power shaft 52 rotates independently of the cutting blade 65.

From the preceding, it should be apparent that the applicant herein has provided, in several embodiments of his invention, a rotary type power lawn mower having a new and novel mower handle controlled combination brake and clutch, where the latter provides positive action, as well as safety features, not present with prior devices. The applicant's invention is adaptable to various forms of brake and is effectively operable whenever the mower handle is in a raised position. Moreover, the invention provides for operation of the cutting blade independently of the rotation of the power shaft of the mower engine.

The lawn mower described hereabove is, of course, susceptible to various changes within the spirit of the invention. For example, the tapered flange in the embodiment of FIGS. 6 to 9, inclusive, may be an integral part of the driven assembly 70. Moreover, linings 71 and 73 may be eliminated, and instead, the rim of the power transfer member 56 modified to be made of friction material. Additionally, instead of employing a disc type brake in this latter embodiment of the invention, selected segments of friction material may be employed and, further, the opening in the bottom of the well 50 extended inwardly and downwardly as a means of limiting the deflection of the engine shaft. Thus, the preceding description should be considered illustrative, and not as limiting the scope of the following claims.

I claim:

1. A rotary power mower comprising in combination, a housing, a mower guide handle pivotally mounted on said housing, an engine mounted on said housing and having a power shaft projecting therethrough, means defining a power transfer surface fixed with said power shaft for rotation therewith, a driven member rotatably mounted within said housing, a brake mechanism mounted on the under side of said housing and above said driven member, a linkage system disposed on said housing and operatively associated with said mower guide handle for selectively elevating said driven member to a braking position against said braking member, a cutting blade mounted on said driven member and pivotal about said power shaft of said engine independently of the speed of rotation of the latter, and clutch members pivotally mounted on said driven member and selectively engageable with said power transfer surface through centrifugal action upon release of said driven member from said braking position.

2. The rotary power lawn mower of claim 1 where said power transfer surface has a portion thereof selectively gravity-engaged by said driven member upon said release of said driven member from said braking position.

3. A rotary power lawn mower comprising a housing, a mower guide handle pivotally mounted on said housing for operation in a lowered operating position and a raised braking position, an engine having a power shaft, a cutting blade rotatably disposed within said housing independently of said power shaft of said engine, a brake and clutch controlling operation of said cutting blade, a linking system connecting said brake and clutch and said mower guide handle so that the clutch will be engaged to operate said cutting blade when said mower guide handle is in said lowered operating position and said clutch will be released and said brake will be applied when said mower guide handle is in said raised braking position, and spring means extending between said housing and said mower guide handle continually urging said mower guide handle to a position effecting braking of said cutting blade.

4. A rotary power mower comprising in combination, a housing, an engine mounted on said housing and having a power shaft projecting therethrough, means defining a power transfer surface fixed with said power shaft for rotation therewith, a driven member rotatably mounted within said housing, a brake mechanism mounted on the under side of said housing and above said driven member, a linkage system disposed on said housing selectively elevating said driven member to a braking position against said braking member, a cutting blade mounted on said driven member and pivotal about said power shaft of said engine independently of the speed of rotation of the latter, and clutch members pivotally mounted on said driven member and selectively engageable with said power transfer surface through centrifugal action upon release of said driven member from said braking position, said power transfer surface also having a portion thereof selectively gravity-engaged by said driven member upon said release of said driven member from said braking position.

5. A rotary power mower comprising, in combination, a housing, an engine mounted on said housing and having a power shaft projecting therethrough, means defining a power transfer surface fixed with said power shaft for rotation therewith, a cutting blade rotatably disposed within said housing independently of said power shaft of said engine, a combination brake-clutch member fixed with said cutting blade for rotation therewith and having centrifugally operable clutch members thereon movable to a clutching position with said power transfer surface, a brake mechanism mounted on said housing proximate said power transfer surface, and means on said housing selectively moving said combination brake-clutch member to a braking position against said brake mechanism and to said clutching position against said power transfer surface.

6. A rotary power mower comprising, in combination, a housing, a mower guide handle pivotally mounted on said housing for operation in a lowered operating position and a raised braking position, an engine mounted on said housing and having a power shaft projecting therethrough, means defining a power transfer surface fixed with said power shaft for rotation therewith, a cutting blade rotatably disposed within said housing independently of said power shaft of said engine, a combination brake-clutch member fixed with said cutting blade for rotation therewith, a brake mechanism mounted on said housing proximate said power transfer surface, means connecting said mower guide handle and said combination brake-clutch member so that when said mower guide handle is in said lower operating position clutching action will operate said cutting blade and when said mower guide handle is in said raised position clutching action will be released and brake action applied, and spring means extending between said housing and said mower guide handle continually urging said mower guide handle to said position effecting braking of said cutting blade.

References Cited by the Examiner
UNITED STATES PATENTS

| | | | |
|---|---|---|---|
| 2,657,517 | 11/1953 | Berdan | 56—295 |
| 2,791,079 | 5/1957 | Funk | 56—25.4 |
| 2,985,992 | 5/1961 | Dowdle | 56—25.4 |
| 3,026,665 | 3/1962 | Hoff | 56—25.4 |
| 3,093,948 | 6/1963 | Root | 56—25.4 |

ABRAHAM G. STONE, *Primary Examiner.*

A. F. GUIDA, ARNOLD RUEGG, *Examiners.*

JOE O. BOLT, JR., *Assistant Examiner.*